US012162179B2

(12) United States Patent
Grunewald

(10) Patent No.: US 12,162,179 B2
(45) Date of Patent: Dec. 10, 2024

(54) SYSTEM AND METHOD FOR PLANK PROCESSING

(71) Applicant: Shaw Industries Group, Inc., Dalton, GA (US)

(72) Inventor: Craig Robert Grunewald, Ringgold, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 206 days.

(21) Appl. No.: 17/810,166

(22) Filed: Jun. 30, 2022

(65) Prior Publication Data

US 2024/0001579 A1 Jan. 4, 2024

(51) Int. Cl.

| | |
|---|---|
| ***B26D 9/00*** | (2006.01) |
| ***B26D 7/06*** | (2006.01) |
| ***B26D 7/32*** | (2006.01) |
| ***B26F 1/40*** | (2006.01) |
| ***B27G 13/14*** | (2006.01) |
| ***B65B 5/06*** | (2006.01) |
| ***B65B 11/00*** | (2006.01) |

(Continued)

(52) U.S. Cl.

CPC ............. *B26D 9/00* (2013.01); *B26D 7/0625* (2013.01); *B26D 7/32* (2013.01); *B26F 1/40* (2013.01); *B27G 13/14* (2013.01); *B65B 5/06* (2013.01); *B65B 11/00* (2013.01); *B65B 35/50* (2013.01); *B65B 63/00* (2013.01)

(58) Field of Classification Search

CPC B65B 5/06; B65B 11/00; B65B 35/50; B65B 63/00; B26D 7/06; B26D 7/0625; B26D 7/32; B26D 9/00; B26F 1/40; B26F 2210/00; B27D 5/006; B27G 13/14; B27M 1/04; B27M 1/08; B27M 3/04; E04F 15/105

USPC .................... 53/435, 113, 513; 144/360, 196

See application file for complete search history.

(56) References Cited

U.S. PATENT DOCUMENTS 8,733,063 B2 5/2014 Song et al.
2005/0056677 A1 * 3/2005 Talken ..................... B26D 7/32 225/93

(Continued)

FOREIGN PATENT DOCUMENTS

CN 202293376 U 7/2012
EP 0917935 A2 * 5/1999 ................ B27F 1/04

(Continued)

OTHER PUBLICATIONS

International Search Report and Written Opinion for PCT International Patent Application No. PCT/US2023/069360, dated Nov. 17, 2023.

*Primary Examiner* — Stephen F. Gerrity
(74) *Attorney, Agent, or Firm* — Lathrop GPM LLP; Laura A. Labeots

(57) ABSTRACT

System and method for producing resilient planks are described. A die punch press is provided to receive and die punch resilient slabs into planks. Die punching the resilient slabs into plural planks can sometimes create a deformity on at least one bottom edge of the plank. The planks are then automatically conveyed from the die punch press to a shaping tool. The shaping tool receives individual planks and forms at least one bevel in the respective plank removing the deformity. The planks can then be stacked and prepared for shipping.

18 Claims, 4 Drawing Sheets

(51) Int. Cl.

| | |
|---|---|
| ***B65B 35/50*** | (2006.01) |
| ***B65B 63/00*** | (2006.01) |

(56) References Cited

U.S. PATENT DOCUMENTS

| | | | | |
|---|---|---|---|---|
| 2009/0226662 | A1* | 9/2009 | Dyczko-Riglin et al. .................. | E04F 15/10 428/95 |
| 2011/0041989 | A1* | 2/2011 | Anspach et al. .. | E04F 15/02033 264/163 |
| 2011/0167744 | A1* | 7/2011 | Whispell et al. . | E04F 15/02038 52/309.1 |
| 2011/0219716 | A1* | 9/2011 | Chen ................. | E04F 15/02033 52/316 |
| 2012/0098184 | A1* | 4/2012 | Lewalski et al. ........ | B26D 7/32 271/145 |
| 2013/0086862 | A1 | 4/2013 | Song et al. | |
| 2013/0139478 | A1* | 6/2013 | Cappelle et al. ..... | B65B 11/004 53/474 |
| 2017/0204619 | A1* | 7/2017 | Rose et al. ............ | E04F 15/105 |

FOREIGN PATENT DOCUMENTS

| | | | | |
|---|---|---|---|---|
| EP | 1982828 | A1 | 10/2008 | |
| ES | 2340555 | T3 | 6/2010 | |
| WO | WO-2022238858 | A1 * | 11/2022 | ............ E04F 15/105 |

* cited by examiner

SYSTEM AND METHOD FOR PLANK PROCESSING

BACKGROUND

Resilient flooring (e.g., Luxury Vinyl (LVT), Luxury Vinyl Plank (LVP), composite flooring panels, rigid and/or flexible floor panels, etc.) is designed to mimic the look and feel of natural materials, such as stone, ceramic or wood. In some respects, current manufacturing processes of resilient flooring can be inefficient and wasteful of the raw materials. For example, in certain processes, during manufacturing, the resilient flooring can be damaged when the slabs of resilient flooring are punched into planks with a die. Such planks can have a fractured bottom or edge that causes a significant gap to appear between the planks upon installation.

Thus, a system and method are needed for efficient processing of resilient slabs into resilient planks for installation.

BRIEF SUMMARY

The presently disclosed system and method pertain to producing profiled resilient planks. Once the resilient planks are die cut, they are processed to create a clean edge. This prevents the planks from having a fractured bottom and allows them to be installed with minimal spacing between planks.

In a first aspect, the present disclosure pertains to a system for producing resilient flooring/planks such as, Luxury Vinyl Tile (LVT) planks. The system includes a die punch press for receiving and die punching a resilient slab into plural planks. The system also includes a shaping tool for receiving an individual plank from the die punch press and shaping a bevel in at least one bottom edge of the individual plank to create a profiled plank. Each profiled plank is a resilient plank without a physical deformity at the bottom edge of the plank.

In another embodiment, the system also includes a resilient slab conveyor for selectively transporting the resilient slab and a plank conveyor for selectively receiving and conveying the planks. The system further includes a first de-stacker for receiving the plural planks from the plank conveyor and a first profile conveyor for selectively receiving individual planks from the first de-stacker. A second profile conveyor for selectively conveying the profiled planks from the shaping tool; and a second de-stacker for receiving the profiled planks from the second profile conveyor and for feeding the profiled planks back to the plank conveyor are also included in the system. The system can additionally include a first robot for moving the plural planks onto the plank conveyor. The system can include a stacker for receiving the profiled planks from the plank conveyor and for stacking the profiled planks. The stacker can be further modified for wrapping the stacked profiled planks.

In a further embodiment, the shaping tool creates complex shapes in the individual plank. The complex shapes include tongue-and-groove or click profiles.

In another embodiment, the individual plank is a rectangular solid having opposite long sides and opposite short sides.

In a further embodiment, the shaping tool is a profiler modified to form the bevel.

In another embodiment, the profiler shapes a cut on at least one side of a plank. Optionally, the profiler shapes a bevel on two to four sides of a plank. The resilient plank can have a planar bevel formed on each short side of the plank. The profiler can be a tenoner.

In a further embodiment, the resilient slabs and planks are at least 3.7 mm thick.

In another embodiment, the die punch press can die punch a resilient slab into thirteen equal-sized planks.

In a further aspect, the present disclosure pertains to a method of preparing resilient flooring/planks. The method includes die punching at least one resilient slab into plural resilient planks; and forming, by a shaping tool, a bevel in at least one bottom edge of each of the plural resilient planks to create a profiled plank. The shaping tool is a profiler configured to form the bevel.

In another embodiment, the method also includes conveying, by a plank conveyor, the plural resilient planks to a first de-stacker and de-stacking, by the first de-stacker, the plural resilient planks into individual ones of the plural resilient planks. The individual ones of the plural resilient planks are conveyed to the shaping tool. The method also includes conveying the profiled planks to a second de-stacker; and feeding, by the second de-stacker, the profiled planks to the plank conveyor. Each of the plural planks can be a rectangular solid having opposite long sides and opposite short sides.

In another embodiment, the profiler shapes a bevel on two to four sides of a plank.

In a further embodiment, the method includes stacking the profiled planks. The method can also include wrapping stacks of the profiled planks and/or boxing stacks of the profiled planks.

DETAILED DESCRIPTION OF EXEMPLARY EMBODIMENTS

Various embodiments provide a system and method for the production of profiled resilient planks. The resilient planks are first die cut from resilient slabs and then processed to create a clean edge. This clean edge allows the planks to be installed with minimal spacing as they do not have a fractured bottom common to customary resilient planks.

In one embodiment, a resilient die punch line is fed with a resilient slab which goes into a press and a die punch cuts the slab into planks. In some embodiments, the resilient slab is greater than or equal to 3.7 mm thick and can be cut into 13 planks. In another example, the slab can be cut into fewer or more planks. In some example embodiments, the thickness of the plank (between the two major surfaces (top and bottom major surfaces)) can be 4 mm, 5 mm, 6 mm, 7 mm, 8 mm, 9 mm, 10 mm, 12 mm, etc. The plank thickness of 3.7 mm can provide sufficient thickness to form a sturdy/reliable locking profile in the planks, and a thickness, below which the die punching may not cause fractured edges. In a further example, the resulting planks are moved to a conveyor, such as by a robot, to feed the planks individually to the shaping equipment. The shaping equipment undercuts the plank on both sides removing the fractured edge on the bottom of the plank, the fractured edge being created by the die punch. In further embodiments, the shaping tool can form additional features and/or complex shapes, such as a tongue or groove along the side(s) of the plank. Turn conveyors bring the planks back to the resilient die punch line. for inspection and boxing out.

The shaping equipment (such as one used to create tongue and grove and click profiles) is provided in-line with the resilient die punch line to provide the capability to undercut the bottom edge of the plank to remove the fracture. Using a die punch avoids sawing the resilient slabs and can yield more planks per slab (e.g., thirteen planks from one slab). Having the die cut and shaping tool together enables the plank manufacturer to process and prepare the planks for shipment to the customer in a single line avoiding multiple handlings of the product.

By combining these elements, the same process line can be used for taking planks off the resilient die punch line, in-feeding the planks into a shaping tool to profile the planks, and then in-feeding the planks back into the resilient die punch line to box the product for customers. Additionally, the lead time is shortened to customers on resilient plank products and risk from injury of handling the product moving between lines is eliminated.

Figure 1:
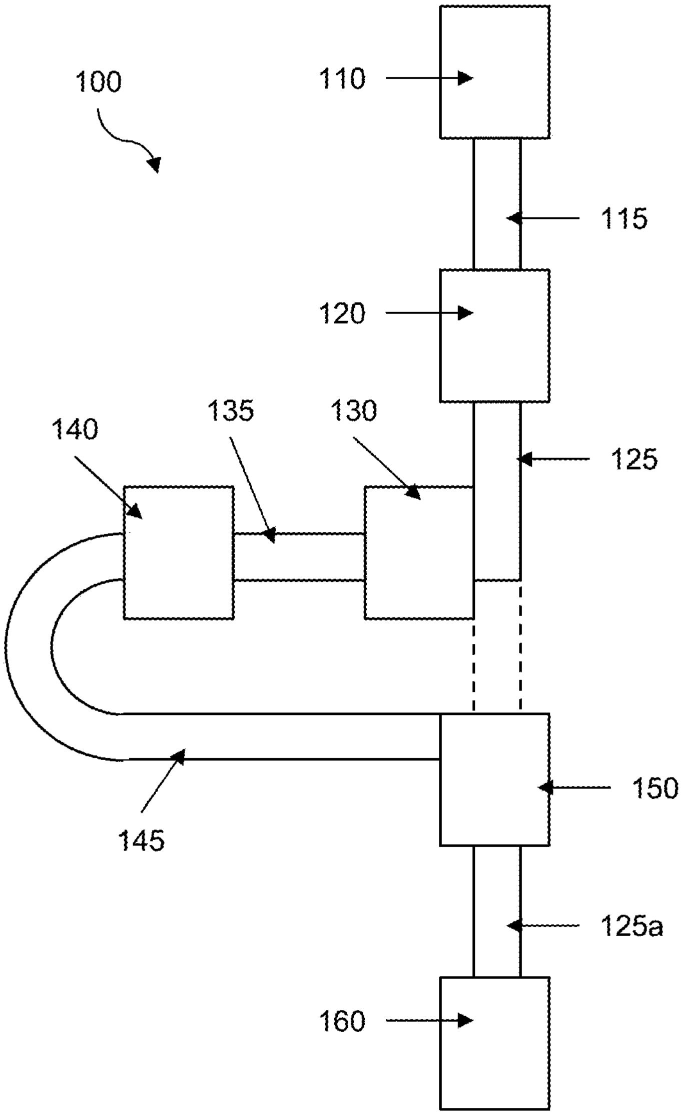
FIG. 1 is a block diagram of an example system for producing resilient planks.

FIG. 1 is a non-limiting example of one embodiment. Various aspects, such as conveyors, turns, stackers and de-stackers can all be changed and adjusted without deviating from the core concepts.

FIG. 1 shows a system 100 for producing resilient planks. The system 100 starts with a resilient slab receiver 110 which takes resilient slabs and puts them on a resilient slab conveyor 115. In some embodiments this can be done manually with a forklift. In other embodiments, this can be automated with robotics.

A resilient slab conveyor 115 transports each of plural resilient slabs to a die punch press 120 for receiving and die punching each of the plural resilient slabs into plural planks. A plank conveyor 125 then selectively receives and conveys the plural planks to a first de-stacker 130. It is noted that there can be a stacker before the first de-stacker 130 that stacks the die punched plural planks. The first de-stacker 130, which can be a robot configured to receive and move the planks, conveys the planks to a first profile conveyor 135. When moved, the planks can be repositioned so that although they start parallel to a direction of movement of conveyor 125 and, after being placed on conveyor 135, they are rotated so as to be parallel to direction of movement of conveyor 135.

The die punch press 120 can cut a stack of resilient slabs in order to produce stacks of planks. The de-stacker 130 can then remove the planks from the stack and place them individually on the first profile conveyor 135.

The first profile conveyor 135 provides the planks to a shaping tool 140 for receiving individual ones of the plural planks from the first profile conveyor 135 and for forming at least one profile in the respective plank.

The shaping tool 140 can be a milling machine which undercuts a long edge in the planks. Alternatively, the shaping tool 140 can be a profiler or a tenoner which forms projections (tenons) on the edge such as for insertion into a mating cavity (mortise). The profiler is typically configured to create a tongue and groove or a locking profile and can be modified to create the bevel cut profile as described in the present disclosure. In some examples, the shaping tool 140 can be a saw.

A second profile conveyor 145 selectively conveys the profiled individual ones of the plural planks from the cutting tool 140 to a second de-stacker 150 for receiving the profiled individual ones of the plural planks from the second profile conveyor 145 and for feeding the profiled individual ones of the plural planks back to the plank conveyor 125/125*a*.

In some embodiments, the plank conveyor 125/125*a* can be a single conveyor or it can be formed of separate individual conveyors. Additionally, the first de-stacker 130 and the second de-stacker 150 can be incorporated into a single de-stacker which is configured to move planks from the plank conveyor 125 to the first profile conveyor 135 and to move profiled planks from the second profile conveyor 145 to the plank conveyor 125*a*.

A stacker 160 receives the plural planks from the plank conveyor 125/125*a* and prepares them for shipping, such as by stacking, boxing and/or wrapping the planks.

Figure 2:
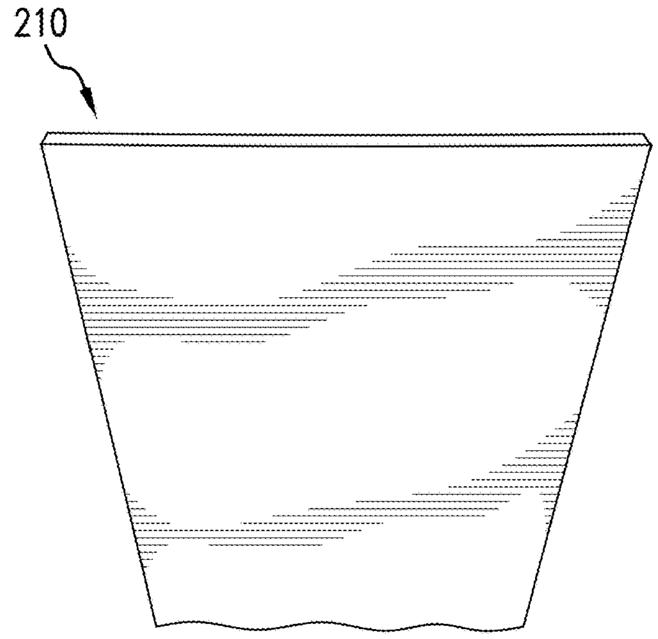
FIG. 2 shows an example standard resilient plank.
Figure 3:
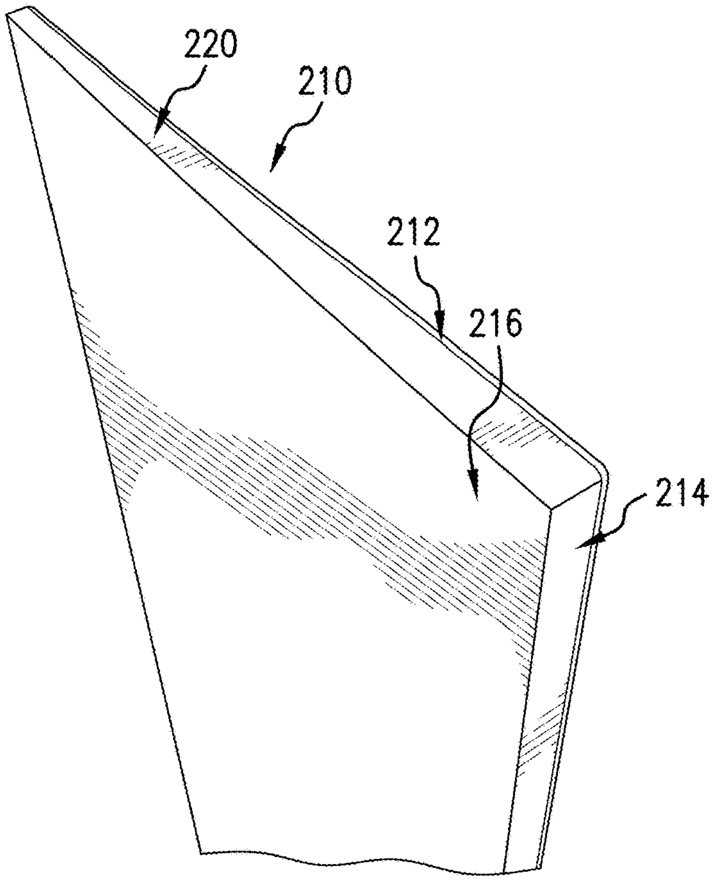
FIG. 3 shows a view of the edge of the example standard resilient plank.

FIG. 2 shows a standard resilient plank 210 and FIG. 3 shows a view of the edge of the standard resilient plank 210. The plank 210 includes an upper surface 212 and a lower surface 216. An edge 214 extends along the long side of the plank 210. In the standard resilient plank 210, the edge 214 is substantially perpendicular to the upper surface 212 and to the lower surface 216. A shorter edge 220 is perpendicular to the edge 214.

Figure 4:
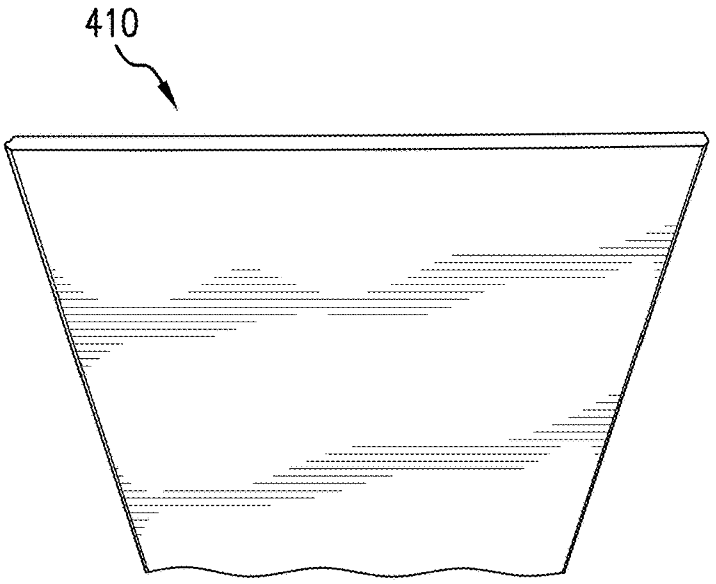
FIG. 4 shows an example profiled resilient plank.
Figure 5:
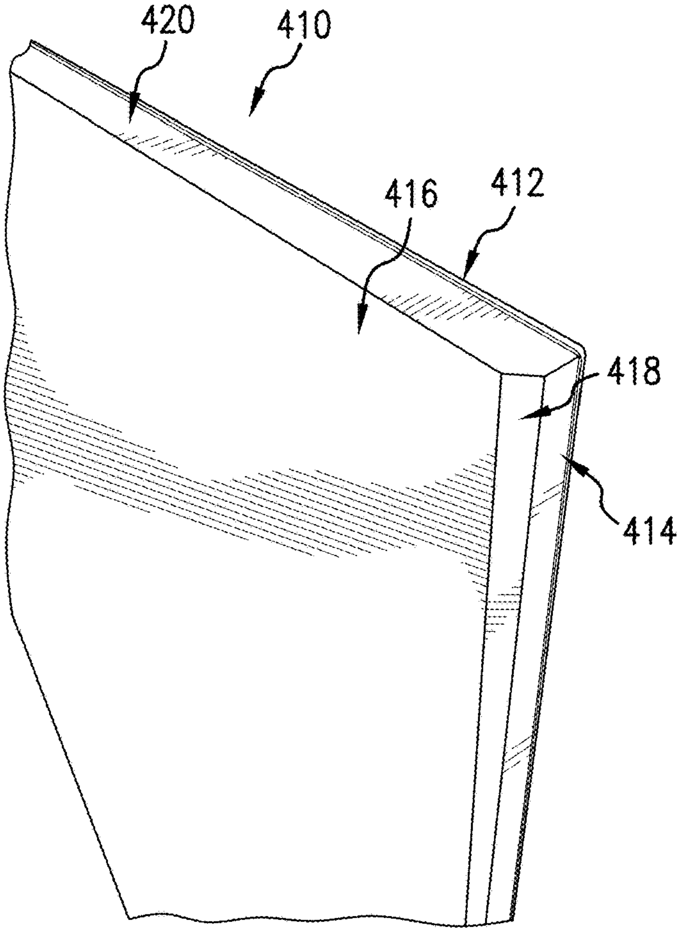
FIG. 5 shows a view of the edge of the example profiled resilient plank.

FIG. 4 shows a profiled resilient plank 410 and FIG. 5 shows a view of the edge of the profiled resilient plank 410. Similar to the plank 210, the plank 410 includes an upper surface 412 and a lower surface 416. The upper surface 412 can be textured or patterned so as mimic natural materials.

In some non-limiting embodiments, the resilient plank 410 can be a LVT plank, LVP, a composite flooring panel plank, and/or rigid or flexible floor panel planks.

An edge 414 extends along the long side of the plank 410 which is substantially perpendicular to the upper surface 412. A profiled edge 418 is provided which is non-perpendicular to the lower surface 416 and to the edge 414. As shown, in one example, the profiled edge 418 is at a substantially 45-degree angle to the lower surface 416 and to the edge 414. A matching profiled edge can also be formed on the opposite long side of the plank 410.

In a non-limiting embodiment, a second profiled edge can be formed between the lower surface 416 and the edge 420. A matching profiled edge can also be formed on the opposite short side of the plank 410.

In alternative embodiments, the edge 414 and profiled edge 418 can form alternative structures and/or complex shapes, such as a tenon and/or mortise, a tongue and groove, etc.

In some embodiments, both long sides of the plank 410 are profiled. In alternative embodiments, one long side of the plank 410 can be profiled while the other side is perpendicular to the upper surface 412 and to the lower surface 416.

Figure 6:
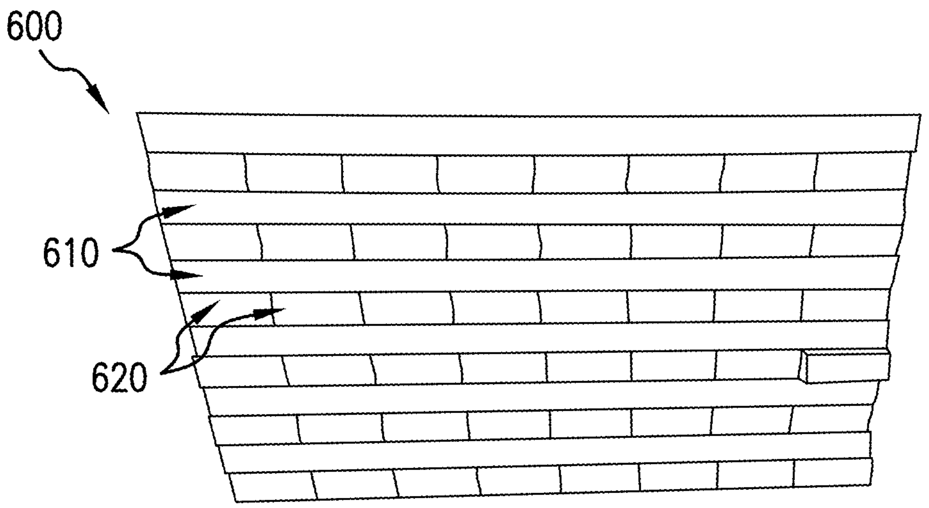
FIG. 6 demonstrates a stack of example profiled resilient planks.
Figure 7:
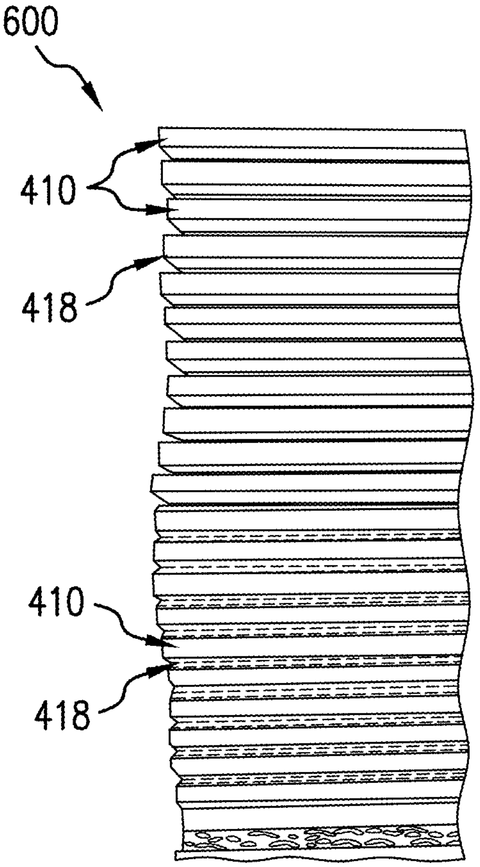
FIG. 7 shows a close-up view of the stack of the example profiled resilient planks.

FIG. 6 demonstrates a stack 600 of profiled resilient planks 410. The planks 410 are cross stacked with rows of lengthwise planks 610 laid across rows of edgewise planks 620. FIG. 7 shows a close-up view of the stack 600 of profiled resilient planks 410 where the profiled edge 418 can be seen.

An exemplary embodiment provides a system for producing resilient flooring/planks, such as, LVT planks. The system includes a resilient slab conveyor for selectively transporting resilient slabs. A die punch press is provided to receive and die punch each resilient slab into a plurality of planks. A plank conveyor is provided to selectively receive and convey the plurality of planks. The system also includes a first de-stacker for receiving the planks from the plank conveyor and a first profile conveyor for selectively receiving individual ones of the plural planks from the first de-stacker. Next, a shaping tool receives individual ones of the plural planks from the first profile conveyor and forms at least one profile in the respective plank. A second profile conveyor selectively conveys the profiled individual ones of the plural planks from the shaping tool and a second de-stacker receives the profiled individual ones of the plural planks from the second profile conveyor and feeds the profiled individual ones of the plural planks back to the plank conveyor.

In a further embodiment of the system above, the system also includes a first robot for moving the plural planks onto the plank conveyor.

In another embodiment of any one of the systems above, each of the plural planks is a rectangular solid having opposite long sides. The shaping tool can also form the profile on at least each of the opposite long sides of a respective one of the plural planks. In one example, the profile can be a planar bevel between each long side and the bottom of a respective one of the plural planks. In other examples, the profile can be a locking mechanism where the planar bevel can be a part of the locking mechanism.

In a further embodiment of any one of the systems above, the shaping tool is a profiler which is configured to create a clean bevel cut on the underside (bottom corner) of the plank and removes the portion of the edge which is deformed/fractured, The profiler can also be a tenoner.

In another embodiment of any one of the systems above, the resilient slabs and plural planks are 3.7 mm or greater in thickness.

A further exemplary embodiment provides a method of preparing resilient planks. The method includes die punching a resilient slab into plural resilient planks. A plank conveyor conveys the plural resilient planks to a first de-stacker. The first de-stacker de-stacks the plural resilient planks into individual ones of the plural resilient planks. The method also includes conveying the individual ones of the plural resilient planks to a shaping tool. The shaping tool forms at least one profile in each of the conveyed ones of the plural resilient planks. The profiled ones of the plural resilient planks are conveyed to a second de-stacker and fed, by the second de-stacker, to the plank conveyor.

In another embodiment of the method above, each of the plural planks is a rectangular solid having opposite long sides. The step of forming at least one profile can include forming the profile on at least one of the opposite long sides of a respective one of the plural planks. The profile can be a planar bevel formed between each long side and the bottom of a respective one of the plural planks.

In a further embodiment of any one of the methods above, the shaping tool is a profiler which is configured to create a clean bevel cut on the underside (bottom corner) of the plank and removes the portion of the edge which is deformed/fractured. The profiler can also be a tenoner.

In another embodiment of any one of the methods above, the resilient slabs and plural planks are 3.7 mm or greater in thickness.

In a further embodiment of any one of the methods above, the profile is a bevel formed on one long side, both long sides, one short side or both short sides.

Alternative embodiments of the subject matter of this application will become apparent to one of ordinary skill in the art to which the present invention pertains, without departing from its spirit and scope. It is to be understood that no limitation with respect to specific embodiments shown here is intended or inferred.

What is claimed is:

1. A system for producing resilient planks comprising:
- a die punch press for receiving and die punching a resilient slab into plural planks;
- a shaping tool for receiving an individual plank from the die punch press and shaping a bevel in at least one bottom edge of the individual plank to create a profiled plank which is a resilient plank without a physical deformity at the bottom edge of the plank;
- a resilient slab conveyor for selectively transporting the resilient slab to the die punch press;
- a plank conveyor for selectively receiving and conveying the planks from the die punch press;
- a first de-stacker for receiving the plural planks from the plank conveyor,
- a first profile conveyor for selectively receiving individual planks from the first de-stacker and conveying the individual planks to the shaping tool;
- a second profile conveyor for selectively conveying the profiled planks from the shaping tool; and
- a second de-stacker for receiving the profiled planks from the second profile conveyor and for feeding the profiled planks back to the plank conveyor.

2. The system of claim 1, wherein the first de-stacker further comprises a first robot for moving the plural planks onto the plank conveyor.

3. The system of claim 1, further comprising a stacker for receiving the profiled planks from the plank conveyor and for stacking the profiled planks.

4. The system of claim 3, wherein the stacker is further modified for wrapping the stacked profiled planks.

5. The system of claim 1, wherein the shaping tool creates complex shapes in the individual plank optionally wherein the complex shapes comprise tongue-and-groove or click profile.

6. The system of claim 1, wherein the individual plank is a rectangular solid having opposite long sides and opposite short sides.

7. The system of claim 1, wherein the shaping tool is a profiler modified to form the bevel.

8. The system of claim 7, wherein the profiler shapes a cut on at least one side of a plank optionally wherein the profiler shapes a bevel on two to four sides of a plank.

9. The system of claim 8, wherein the resilient plank comprises a planar bevel formed on each short side of the plank.

10. The system of claim 7, wherein the profiler is a tenoner.

11. The system of claim 1, wherein the resilient slabs and planks are at least 3.7 mm thick.

12. The system of claim 1, wherein the die punch press is configured to die punch a resilient slab into thirteen equal-sized planks.

13. A method of preparing resilient planks comprising:
- die punching at least one resilient slab into plural resilient planks;
- forming, by a shaping tool, a bevel in at least one bottom edge of each of the plural resilient planks to create a profiled plank, wherein the shaping tool is a profiler configured to form the bevel;
- conveying, by a plank conveyor, the plural resilient planks to a first de-stacker;

de-stacking, by the first de-stacker, the plural resilient planks into individual ones of the plural resilient planks;

conveying the individual ones of the plural resilient planks to the shaping tool;

conveying the profiled planks to a second de-stacker; and feeding, by the second de-stacker, the profiled planks to the plank conveyor.

14. The method of claim 13, wherein each of the plural planks is a rectangular solid having opposite long sides and opposite short sides.

15. The method of claim 13, wherein the profiler shapes a bevel on two to four sides of a plank.

16. The method of claim 13, further comprising stacking the profiled planks.

17. The method of claim 16, further comprising wrapping stacks of the profiled planks.

18. The method of claim 16, further comprising boxing stacks of the profiled planks.

* * * * *